United States Patent [19]

Harrington et al.

[11] Patent Number: 4,485,145

[45] Date of Patent: Nov. 27, 1984

[54] CHEMICALLY MODIFIED HIGH OIL ASPHALT

[75] Inventors: Edward R. Harrington, Naperville, Ill.; William E. Uffner, Newark, Ohio; Richard T. Janicki, Oak Lawn, Ill.

[73] Assignee: Owens-Corning Fiberglas Corporation, Toledo, Ohio

[21] Appl. No.: 557,020

[22] Filed: Dec. 1, 1983

Related U.S. Application Data

[62] Division of Ser. No. 407,373, Aug. 12, 1982, Pat. No. 4,444,947.

[51] Int. Cl.$^3$ .................. B32B 11/02; C08L 95/00
[52] U.S. Cl. .................................... 428/378; 428/265; 428/290; 428/291; 428/375; 428/392; 428/394; 428/440; 428/441; 428/489; 428/521
[58] Field of Search ............. 525/54.5; 527/500; 524/68, 59; 428/290, 291, 265, 440, 441, 489, 521, 392, 375, 378, 394

[56] References Cited

U.S. PATENT DOCUMENTS

| | | | |
|---|---|---|---|
| 3,900,692 | 8/1975 | Rostler | 106/278 |
| 4,021,393 | 5/1977 | McDonald | 106/273 R |
| 4,175,978 | 11/1979 | Marzocchi | 106/281 R |
| 4,273,685 | 6/1981 | Marzocchi | 428/392 |
| 4,332,705 | 6/1982 | Uffner | 527/500 |
| 4,347,171 | 8/1982 | Uffner | 524/71 |
| 4,404,316 | 9/1983 | Marzocchi | 525/54.5 |
| 4,426,419 | 1/1984 | Uffner | 525/54.5 |

OTHER PUBLICATIONS

"Road Glass" Spot Repair System Owens/Corning Pub. No. 5-RS-10166-A Sep. 1981.

Primary Examiner—Ellis P. Robinson
Attorney, Agent, or Firm—Ronald C. Hudgens; Robert F. Rywalski; Keith V. Rockey

[57] ABSTRACT

A chemically modified asphalt composition is provided which is especially adapted for use in the repair and maintenance of highways. The composition is a reaction product of a high oil asphalt, a vinyl aromatic monomer and a rubbery, or elastomeric, polymer.

1 Claim, No Drawings

CHEMICALLY MODIFIED HIGH OIL ASPHALT

This is a division of application Ser. No. 407,373, filed Aug. 12, 1982, U.S. Pat. No. 4,444,947.

CROSS REFERENCES

The present application is related to the subject matter of copending application U.S. Ser. No. 359,328 and 360,729, both of which are hereby incorporated by reference.

TECHNICAL FIELD

The present invention is related to chemically modified asphalts, and more specifically, to asphalts which are chemically modified by reaction with a vinyl aromatic monomer and a rubbery, or elastomeric, polymer. The present invention is also related to glass fibers coated with such chemically modified asphalt compositions and to preformed membranes comprising a fibrous reinforcement which is coated with such chemically modified compositions.

BACKGROUND AND SUMMARY

Chemically modified asphalts are receiving widespread commercial use especially in the areas of highway maintenance and repair. As used herein, the term "highway maintenance and repair" includes not only the repair and maintenance of highways and roads but also contemplates, within its scope, such structures as driveways, parking lots, airport runways and like vehicular supporting surfaces, and also contemplates, within its scope, waterproofing of bridge decks. Exemplary of such chemically modified asphalt compositions are those produced by reacting asphalt, a vinyl aromatic monomer and a rubbery or elastomeric polymer, as set forth example in U.S. Pat. No. 4,273,686, which is hereby incorporated by reference. Such types of compositions have been employed for minimizing reflective cracking, for joint and crack sealing purposes, for bridge deck waterproofing and for pothole repair. These compositions may be employed as is or, if desired, glass fibers may be dispersed therein. In highway repair and maintenance, for purposes of minimizing reflective cracking, cracks may first be filled with such chemically modified asphalt compositions, and then the crack overlaid with a fibrous reinforcement material, preferably a glass fiber reinforcing material, and the reinforcing material then overcoated with a hot application of such chemically modified asphalts.

While chemically modified asphalts, which are produced by reacting a paving grade asphalt, a vinyl aromatic monomer and a rubber or elastomeric polymer, have many outstanding properties making them well adapted for applications indicated above, such formulations need to be improved with respect to their resistance to thermal degradation and with respect to their low temperature flexural strength properties.

Compared to such chemically modified asphalts, wherein the asphalt employed is an AC—20 paving grade asphalt, the present invention provides compositions which have increased resistance to thermal degradation and improved low temperature flexural strengths, and which can be synthesized in a shorter period of time. That is, ingredients employed in the present invention generally show enhanced reaction kinetics compared to the use of an AC—20 paving grade asphalt. Essentially, the present invention is a chemically modified asphalt composition comprising the reaction product of a high oil asphalt, a vinyl aromatic monomer and a rubbery, or elastomeric, polymer.

DESCRIPTION OF THE INVENTION

As indicated above, the present compositions are produced by reacting a high oil asphalt, a vinyl aromatic monomer and a rubbery, or elastomeric copolymer. The reaction is done at a temperature and time sufficient to allow the reaction to proceed. Preferably, the reaction is done by heating at a temperature of at least about 150° C. for at least about 15 hours. Outstanding results will be obtained by reacting the ingredients by heating at a temperature of about 165° C. for about 15 or 16 hours up to about 24 hours. More generally, with respect to the involved type reactions, it will be found that in plotting viscosity against time, at a given reaction temperature, a curve generally having three portions will be obtained. Actually, there may be a fourth portion in the initial stages of the reaction where the curve will show a slight decrease in viscosity, but this is generally felt to be a dissolution phenomenon, where the system becomes more homogeneous and flowable, rather than the result of a chemical reaction and, consequently, this early viscosity changing stage is not viewed as part of the three portion curve. The first portion of the curve is characterized by a generally modest increase in viscosity and is followed by the second portion which is more steep than the first portion because of a more rapid increase in viscosity. This second portion is then followed by the third, or plateau, portion which is characterized by a slow, or modest, viscosity increase. Suitably, the reaction will be conducted for a time sufficient for the viscosity to reach the third, or plateau, portion of the viscosity-time curve. This viscosity, where the second portion of the curve generally changes to the plateau portion of the curve, may be viewed as a plateau viscosity. Preferably, however, the reaction will be conducted for a time which is at least about 20 or 25% greater than the time needed to reach the plateau viscosity. Times of about 1.2 to about 1.5 times the time needed to reach the plateau viscosity at a given reacting temperature produce outstanding chemically modified asphalts. While the proportions of ingredients may vary depending on the specific application employed, quite outstanding compositions will be obtained when the vinyl aromatic monomer is employed in an amount of about 7 to 20% by weight based on the asphalt, and the rubbery, or elastomeric polymer, is used in an amount ranging from about 5 to about 14% by weight based on the weight of the asphalt.

The high oil asphalts employed in the present invention are not paving grade asphalts but are more in the nature of what is recognized in the roofing industry as a blown roofer's flux. Approximately 20% of the asphalt produced currently would be considered high oil asphalt. High oil asphalt is residual from a refining tower, either vacuum or gravity, which has a low asphaltene content, e.g. less than about 25% (weight), and a high combined naphthene and polar aromatic content, e.g. greater than about 40%, which residue is air blown to produce an asphalt with a high penetration (at 77° F.) to softening the point ratio. Desirably, the penetration to softening point ratio will be about 0.385 with a penetration of at least about 50 and a softening point of, for example, about 130° F. Air blowing of, for example, Union Oil VTB asphalt to produce an asphalt which has a softening point of about 130° F. (54° C.), a penetration at 77° F. of about 60, a flashpoint of about 580° F. (304° C.) and a Brookfield viscosity at 400° F. (204° C.) of about 40 cps exemplifies a specific suitable material. Desirably, the high oil asphalts employed in the present invention have a dimensionless viscosity factor of at least about 120 and more suitably about 125–135. This viscosity factor is calculated according to the formula:

$$A/B \times \log A/\log B$$

where A is the viscosity of the asphalt at 200° F. and B is the viscosity of the same asphalt at 325° F. AC—20 asphalts, for example, have viscosity factors of less than about 100 and typically about 85–95. Generally, the high oil asphalts employed herein will have a viscosity of about 550 cps to about 700 cps at 260° F.

The polymerizable vinyl aromatic monomer preferably will be one of the general formula $(R_1)(R_2) C=C (R_2)(R_3)$, wherein $R_1$ is an aromatic group containing six to 12 carbon atoms, including a phenol group, a substituted phenol group, wherein the substituant is any one of a cyano group, a hologen group, a C1 to C3 alkyl group, a hydroxy group, a nitro group, etc.. $R_2$ is preferably hydrogen or a lower alkyl, e.g. a $C_1$ to $C_5$ alkyl such as methyl and $R_3$ is hydrogen or such lower alkyl.

As the rubbery, or elastomeric, polymer, use can be made of a number of non-depolymerized elastomeric materials which are homopolymers of a conjugated diene (for example, butadiene isoprene, chloroprene) and more generally, a conjugated diene having about 4 to 6 carbon atoms, or a copolymer of such conjugated dienes with at least one ethylenic monomer copolymerizable therewith, such as, for example, styrene, acrylonitrile, methocrylonitile.

Such nondepolymerized polymers are widely available commercially with the suitable polymers being a copolymer of styrene and butadiene such as that marketed by Phillips Petroleum as their Solprene 1205C elastomer.

In addition to the uses described above for highway repair and maintenance purposes, the present compositions can also be employed in forming preformed membranes for such uses. Preformed membranes for such purposes are known in the art and generally comprise a fibrous reinforcement material having an asphaltic coating thereon. Generally, one side of such membranes will also include a pressure sensitive adhesive which is adapted to adhesively secure the membrane to the supporting surface, such as, for example, a cementitous surface like asphalt or concrete.

While the foregoing describes the present invention with sufficient particularity to enable those skilled in the art to make and use the present invention, nonetheless, there follows a nonlimiting example thereof. The high oil asphalt was prepared by air blowing a tower residue having an asphaltene content of less than about 25% and a combined naphthene and polar aromatic content in excess of about 40% (Union Oil VTB asphalt) to a penetration of about 60 and a softening point of about 130° F. (penetration to softening point ratio of about 0.46). This material had a viscosity factor of about 125–135 and a viscosity at 260° F. of about 550–700 cps.

EXAMPLE I

A chemically modified asphalt was prepared from a batch of 77.6% by weight of the above high oil asphalt, 10% by weight of styrene and 12.5% by weight of a copolymer of styrene and butadiene (Solprene 1205C copolymer). The chemically modified asphalt was prepared in a reactor equipped with an agitator and reflux condenser by first heating the asphalt to melt it and then, with mixing and charging the styrene and styrene-butadiene copolymer thereto followed by heating at a temperature of about 165° C. The time of reaction was varied between about 16–24 hours.

The above composition was compared to chemically modified asphalts similarly prepared but employing an AC—20 paving grade asphalt instead of the high oil asphalt. AC—20 asphalt has a penetration of 42–65 and a softening point of about 122° F.–127° F. with the higher penetration correlating to the lower softening point. The AC—20 asphalt had a viscosity factor of 85–95.

Samples of these two types of chemically modified asphalts were then submitted to a viscosity recovery test. In this test, samples are initially heated to a reference temperature, for example, 380° F. and held there for a prescribed period of time, for example five minutes, then heated to another temperature, for example, 480° F. and held there for a prescribed period of time, after which time that sample would then either be cooled down to the reference temperature, for example, 380° F. or in some instances, heated to another temperature, for example, 500° F. held at that temperature level for a prescribed time and then again cooled down to the reference temperature. The viscosity recovery, (the initial viscosity at the reference temperature divided into the viscosity of the material after it had been heated to higher temperatures and then cooled down again to the reference temperature) was significantly higher for the chemically modified asphalt produced from the high oil asphalt than that produced from an AC—20 paving grade asphalt. This ratio of the viscosity after heat cycling to the initial viscosity indicates that the chemically modified asphalt produced from the high oil asphalt is more resistant to thermal degradation than is the chemically modified asphalt made from an AC—20 paving grade asphalt.

Additionally, the chemically modified asphalts manufactured from the high oil asphalt and an AC—20 asphalt were compared for their low temperature flexural strengths. This was done by making films of the respective materials, for example, films having a thickness on the order of about 0.125 inches and then bending these films over a 1" mandrel. Unsatisfactory flexural strengths were qualitatively determined by the occurrence of crazing and cracks. The chemically modified asphalt manufactured from the high oil asphalt showed good flexural strength properties at about −35° F., whereas the chemically modified asphalt manufactured from an AC—20 asphalt showed satisfactory flexural strengths down to about −8° F.

Additionally, the chemically modified asphalt manufactured from the high oil asphalt shows a significantly less tacky surface and is firmer in that it has increased resistance to deformation than the chemically modified asphalt produced from an AC—20 asphalt.

It has also been observed that the reaction rate using high oil asphalts is higher than that using an AC—20 asphalt. As will be readily apparent to those skilled in the art, since the chemically modified asphalts of the present invention exhibit greater viscosity recovery, it will be apparent that they will be more reliable for use in the field, especially in those instances where the material is applied hot, which requires heating in tar kettles, or asphalt melters. Thus, if overheating is effected, there will be a significantly better return to the desired viscosity, and since the compositions of the present invention have increased resistance to thermal degradation, adverse consequences of such degradation will be greatly minimized.

INDUSTRIAL EXPLOITATION

The compositions of the present invention may be industrially exploited by employing them as hot applications for purposes of highway repair and maintenance, such as, for example, in suppressing reflection cracking, crack sealing, bridge deck waterproofing and pothole repair. In suppressing reflection cracking, the materials will be employed by first filling the crack with an appropriate asphaltic-based material, for example, the present compositions, then overlaying the filled crack with a fibrous reinforcement material, such as, for example, a glass fiber reinforcement like a woven roving, and then overcoating the fibrous reinforcement with a hot application of the compositions of the present invention. Because of the improved resistance to thermal degradation, the materials of the present invention may be applied over a wide temperature range and will be effective over a wide ambient temperature range because of the improved low temperature flexural strengths of these compositions. These compositions are well adapted for forming laminates, for use in highway repair and maintenance, of the type set forth in the incorporated applications.

While the above describes the present invention, it will, of course, be apparent that modifications are possible which, pursuant to the patent statute and laws, do not depart from the spirit and scope thereof.

We claim:

1. Glass fibers having an asphaltic coating which comprises an asphaltic-based composition which comprises the reaction product of a high oil asphalt, a vinyl aromatic monomer and a homopolymer of a conjugated diene or a copolymer of a conjugated diene with at least one ethylenic monomer copolymerizable therewith, said asphalt being an air blown high oil asphalt having a viscosity factor of greater than about 120.

* * * * *